US 12,535,155 B2

(12) United States Patent
Haddock et al.

(10) Patent No.: US 12,535,155 B2
(45) Date of Patent: Jan. 27, 2026

(54) PIPE SUPPORT

(71) Applicant: MIRO Industries, Inc., Heber City, UT (US)

(72) Inventors: Jason Reed Haddock, Heber City, UT (US); John Nathan Post, Heber, UT (US); Samuel Richard Robins, Heber City, UT (US); Gary JR Kummer, Orem, UT (US)

(73) Assignee: MIRO Industries, Inc., Heber City, UT (US)

( * ) Notice: Subject to any disclaimer, the term of this patent is extended or adjusted under 35 U.S.C. 154(b) by 0 days.

(21) Appl. No.: 18/518,021

(22) Filed: Nov. 22, 2023

(65) Prior Publication Data

US 2024/0084930 A1    Mar. 14, 2024

Related U.S. Application Data

(63) Continuation of application No. 29/847,057, filed on Jul. 21, 2022.

(51) Int. Cl.
*F16L 3/22*    (2006.01)
*F16L 3/24*    (2006.01)

(52) U.S. Cl.
CPC ............ *F16L 3/222* (2013.01); *F16L 3/243* (2019.08)

(58) Field of Classification Search
CPC . F16L 3/222; F16L 3/243; F16L 3/223; F16L 3/26
See application file for complete search history.

(56) References Cited

U.S. PATENT DOCUMENTS

| 2,846,169 | A  | * | 8/1958 | Sullivan | F16L 3/04 |
| | | | | | 248/62 |
| 7,922,130 | B2 | * | 4/2011 | Hawkins | F16L 3/243 |
| | | | | | 52/480 |
| 8,540,194 | B2 | * | 9/2013 | Azuma | F16L 3/243 |
| | | | | | 248/68.1 |
| 9,726,303 | B1 | * | 8/2017 | Gretz | F16L 3/00 |
| 11,572,694 | B2 | * | 2/2023 | Ball | F16L 3/223 |

(Continued)

FOREIGN PATENT DOCUMENTS

| CA | 2997067 A1 | * | 9/2018 | ............. E04D 13/00 |
| WO | WO-2011004432 A1 | * | 1/2011 | ................ F16L 3/04 |

OTHER PUBLICATIONS

Arnocanali Klimafix model No. NPB8450 floor base sold on amazon dated Jan. 31, 2019, https://www.amazon.com/-/zh_TW/NBP8450/dp/B079C5N611 (Year: 2019).*

(Continued)

*Primary Examiner* — Terrell L Mckinnon
*Assistant Examiner* — Ding Y Tan
(74) *Attorney, Agent, or Firm* — MASCHOFF BRENNAN

(57) ABSTRACT

A pipe support may include a body. The body may include a first side. The first side may include a channel defined along a length of the body. The body may further include a second side opposite the first side. The second side may include a first planar surface. The body may further include a third side. The third side may include a concave surface defined along the length of the body. The body may further include a fourth side opposite the third side. The fourth side may include a second planar surface.

20 Claims, 11 Drawing Sheets

(56) References Cited

U.S. PATENT DOCUMENTS

| | | | | |
|---|---|---|---|---|
| 12,228,230 B2* | 2/2025 | Georgeau | ............... | F16L 3/243 |
| 2007/0120036 A1* | 5/2007 | Olle | ................. | F24F 13/0254 |
| | | | | 248/615 |
| 2009/0272856 A1* | 11/2009 | Azuma | ................. | F16L 3/04 |
| | | | | 248/49 |
| 2010/0155545 A1* | 6/2010 | Birli | ................. | F16L 3/13 |
| | | | | 248/65 |
| 2010/0308181 A1* | 12/2010 | Azuma | ................. | F16L 3/04 |
| | | | | 248/49 |
| 2012/0025034 A1* | 2/2012 | Turner | ................. | F16L 3/04 |
| | | | | 248/65 |
| 2012/0119037 A1* | 5/2012 | Azuma | ................. | F16L 3/04 |
| | | | | 248/65 |
| 2014/0020224 A1* | 1/2014 | Heims | ................. | F16L 3/2431 |
| | | | | 248/71 |
| 2014/0332641 A1* | 11/2014 | Wilson | ................. | F16L 3/04 |
| | | | | 248/71 |

OTHER PUBLICATIONS

Unistrut 2011 catalog discloses Unipier® rooftop pipe support system, http://www.edgecs.com/documents/large_files/Unistrut_Unipier_Rooftop_Pipe_Support_System.pdf (Year: 2011).*

Rooftop pvc pipe support sold on amazon.com, first available date Mar. 2018, https://www.amazon.com/ROOFTOP-SLEEPER-SUPPORT-Rooftop-Recycled/dp/B07C91DC31?th=1 (Year: 2018).*

Portalsplus pedestal plus rooftop pipe support online product page, web.archive.org dated at Jul. 31, 2014 https://www.portalsplus.com/products/pedestal-plus (Year: 2014).*

* cited by examiner

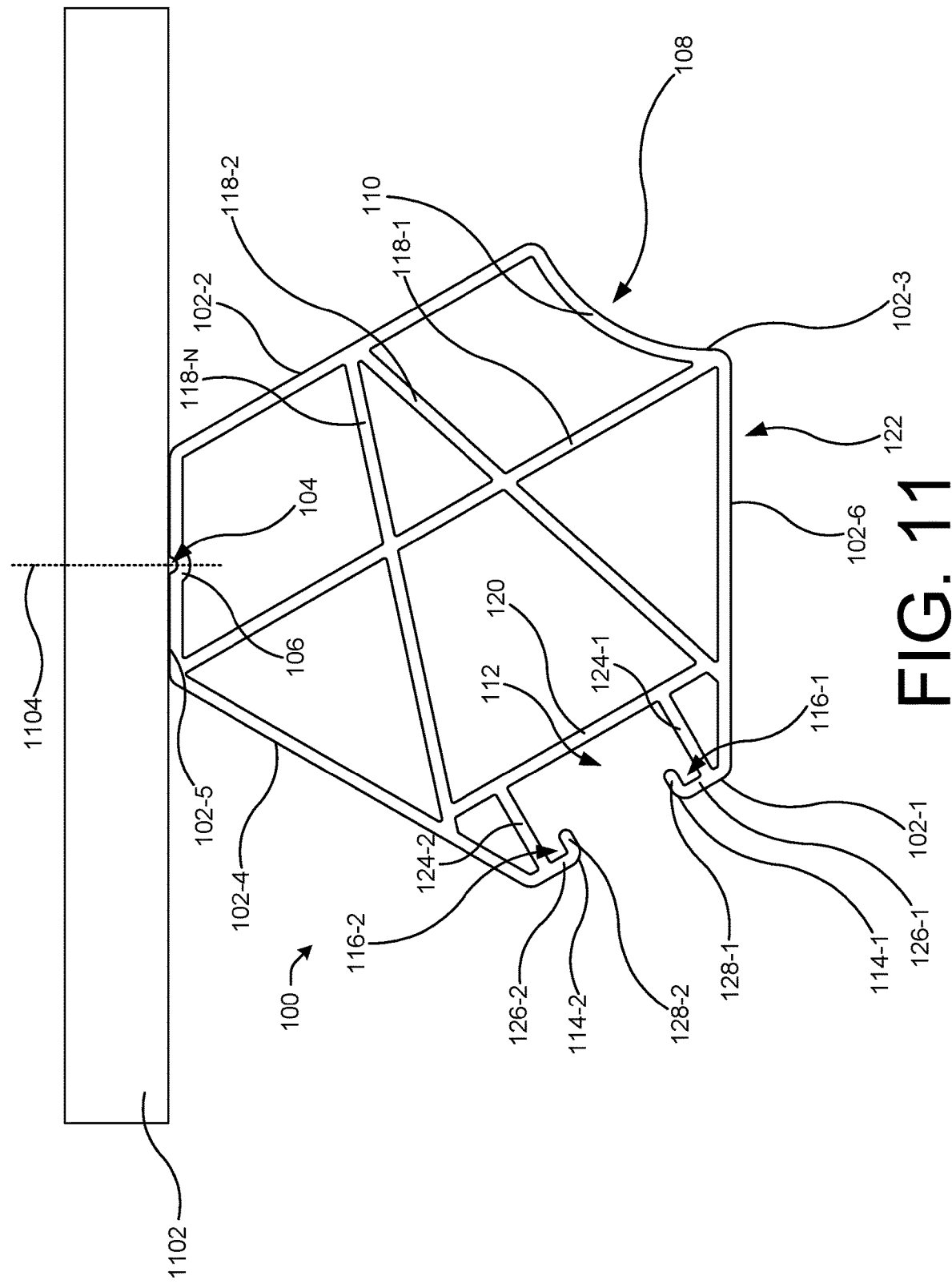

PIPE SUPPORT

RELATED MATTERS

This U.S. patent application claims the benefit of priority of U.S. Design patent application Ser. No. 29/847,057, filed Jul. 21, 2022, the content of which is incorporated in its entirety herein by reference.

TECHNICAL FIELD

The present disclosure relates generally to pipe supports. Specifically, the present disclosure relates to systems, devices, and methods for a pipe support for use in supporting pipes and other elements on a rooftop of a structure.

BACKGROUND

Residential and commercial buildings and other structures are ubiquitously provided with utility services such as electrical, water, natural gas, telecommunications, and sewer services, among other services. Consequently, infrastructure required to support these services as well as associated appliances and devices may be installed in the structures to provide these utility services throughout the structure. Natural gas pipes, electrical conduits, drainage pipes, and other infrastructure, along with appliances such as heating, ventilation, and air conditioning (HVAC) devices may be placed on a rooftop of the structure to allow for these infrastructure elements to be removed from the interior spaces of the structure. This locating of the infrastructure outside of the interior building space allows for more space inside the structure to be utilized. Further, these infrastructure elements may be placed on the rooftop of the structure to provide easy access to the infrastructure and any associated appliances by service professionals.

The infrastructure elements described above may be placed on and/or run along the roof of the structure. These infrastructure elements are often supported above the horizontal surface at intervals along their length by placing supporting mechanisms, like blocks of wood or other objects, between the horizontal surface and the infrastructure elements. When the temperature changes, the infrastructure elements such as the pipes may expand and contract and often the wood block moves with infrastructure elements because, in part, of the large contact surface area and or the coefficient of friction between the block and the infrastructure elements. Eventually, movement of the block against the roof combined with the weight of the infrastructure elements on the wood block causes damage to the roof, resulting in leaks and requiring expensive roof repair. Even if the wood blocks are secured to the roof using, for example, a number of fasteners, the fasteners and the wood block may deteriorate due to exposure to the environment, and the wood blocks may break loose from the infrastructure elements. This may, in turn, case damage to the infrastructure elements and/or the roof surface of the structure.

There may exist a number of types of other infrastructure element-supporting mechanisms that may include a substantially planar-bottomed base and a pipe supporting structure rising from the base that distributes the weight of the pipe over the base and, therefore, over the area of the roof in contact with the base. However, these other infrastructure element-supporting mechanisms may not be able to support the myriad types of infrastructure elements such as the above-mentioned natural gas pipes, electrical conduits, drainage pipes, and other infrastructure, along with the appliances such as the HVAC devices that may be placed on a rooftop of the structure.

Further, other supporting elements can be expensive, especially where the supporting devices include or incorporate coupling devices and threaded vertical supports. These other supporting elements may also be disadvantaged by complexity and may be difficult to install along the surface of the roof of the structure. Yet another issue with these other supporting elements is that their mechanical strength may be limited for their weight.

Therefore, there exists a need for a versatile infrastructure support device that is capable of easily distributing the load of the infrastructure elements over the surface of the roof without suffering from the above-mentioned shortfalls and disadvantages of other infrastructure element-supporting mechanisms.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 11 illustrates a rear side view of the pipe support of FIG. 1 including a device coupled thereto, according to an example of the principles described herein.

DESCRIPTION OF EXAMPLE EMBODIMENTS

Figure 1:
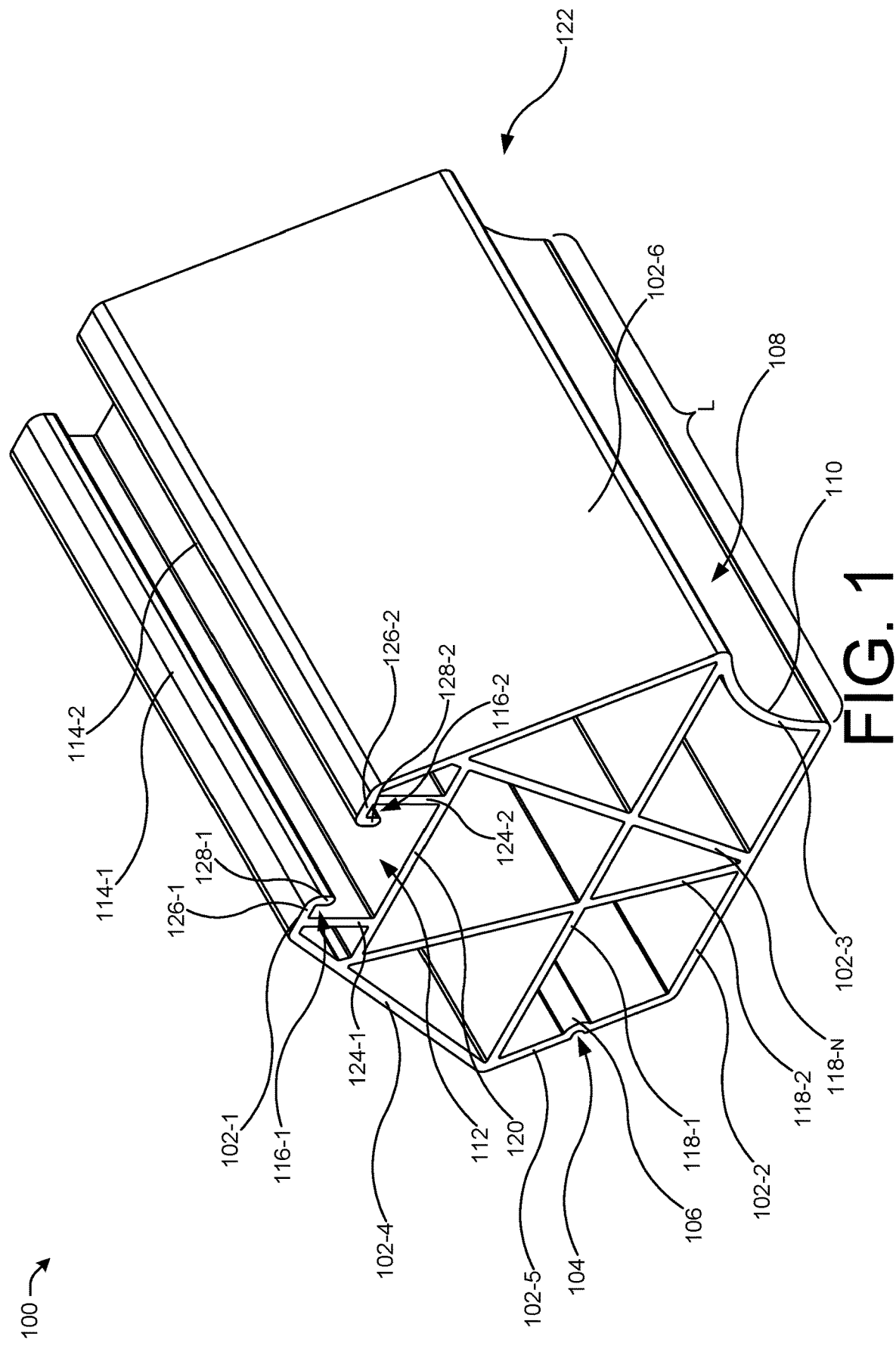
FIG. 1 illustrates a top, front perspective view of a pipe support, according to an example of the principles described herein.

Current systems and methods to support infrastructure elements across a surface such as a rooftop may include, for example, blocks of wood or other objects, placed between the horizontal surface of the rooftop and the infrastructure elements. However, as indicated above, these previous systems and methods have significant disadvantages. The present systems and methods include a multifunctional and multi-positionable pipe support. The pipe support may be used to support any number of objects including, for example water pipes, sewage pipes, natural gas pipes, electrical conduits, drainage pipes, and other infrastructure, along with appliances such as HVAC devices.

Overview

In the examples described herein, a pipe support may include a multi-sided cross section such as, for example, a hexagonal cross section. Opposite sides of the multi-sided pipe support may allow for different types of infrastructure elements to be supported by the pipe support based on the faces of the multi-sided pipe support that are facing upwards and the faces of the multi-sided pipe support that are facing a surface such as the surface of a rooftop.

Examples described herein provide a pipe support. The pipe support may include a body comprising a multi-sided cross section. The multi-sided cross section may include a first side including a channel defined along a length of the body, a second side opposite the first side including a first planar surface, a third side including a concave surface defined along the length of the body, and a fourth side opposite the third side including a second planar surface. The multi-sided cross section may further include a fifth side including a recess defined along the length of the body and a sixth side opposite the fifth side including a third planar surface.

The channel may include a base portion formed parallel to the first side and defined along the length of the body, a first side wall formed perpendicular to the base portion at a first side of the base portion and defined along the length of the body, a second side wall formed perpendicular to the base portion at a second side of the base portion and defined along the length of the body, a first overhang coupled to the first side wall, and a second overhang coupled to the second side wall. The first overhang may include a first horizontal portion coupled perpendicularly to the first side wall and formed along the length of the body, and a first protrusion coupled perpendicularly to the first horizontal portion and formed along the length of the body. The second overhang may include a second horizontal portion coupled perpendicularly to the second side wall and formed along the length of the body, and a second protrusion coupled perpendicularly to the second horizontal portion and formed along the length of the body.

The concave surface defined in the third side of the body may include a curvature that matches a curvature of an outer surface of a pipe. The recess defined in the fifth side of the body may be dimensioned to position a fastener into the recess. The pipe support may further include at least one internal support. The at least one internal support may include a first internal support formed between the first side and a middle of the second side, a second internal support formed between the first side and the middle of the second side, and a third internal support formed between a first intersection of the fifth side and the fourth side and a second intersection of the third side and the sixth side. The at least one internal support may be monolithically formed with at least two of the first side, the second side, the third side, the fourth side, the fifth side, and the sixth side. The pipe support may include a metal, a metal alloy, a polymer, carbon fiber, or combinations thereof.

Examples described herein also provide a pipe support including a body including a multi-sided cross section. The multi-sided cross section may include a first side including a channel defined along a length of the body, a second side opposite the first side including a first planar surface, a third side including a concave surface defined along the length of the body, a fourth side opposite the third side including a second planar surface, a fifth side including a recess defined along the length of the body, and a sixth side opposite the fifth side including a third planar surface.

The channel may include a base portion formed parallel to the first side and defined along the length of the body, a first side wall formed perpendicular to the base portion at a first side of the base portion and defined along the length of the body, a second side wall formed perpendicular to the base portion at a second side of the base portion and defined along the length of the body, a first overhang coupled to the first side wall, and a second overhang coupled to the second side wall.

The first overhang may include a first horizontal portion coupled perpendicularly to the first side wall and formed along the length of the body, and a first protrusion coupled perpendicularly to the first horizontal portion and formed along the length of the body. The second overhang may include a second horizontal portion coupled perpendicularly to the second side wall and formed along the length of the body, and a second protrusion coupled perpendicularly to the second horizontal portion and formed along the length of the body.

The concave surface defined in the third side of the body may include a curvature that matches a curvature of an outer surface of a pipe. The recess defined in the fifth side of the body may be dimensioned to position a fastener into the recess.

The pipe support may further include at least one internal support. The at least one internal support may include a first internal support formed between the first side and a middle of the second side, a second internal support formed between the first side and the middle of the second side, and a third internal support formed between a first intersection of the fifth side and the fourth side and a second intersection of the third side and the sixth side. The at least one internal support may be monolithically formed with at least two of the first side, the second side, the third side, the fourth side, the fifth side, and the sixth side. The pipe support may include a metal, a metal alloy, a polymer, carbon fiber, or combinations thereof. The channel may be configured to couple with a strut nut.

Example Embodiments

Figure 2:
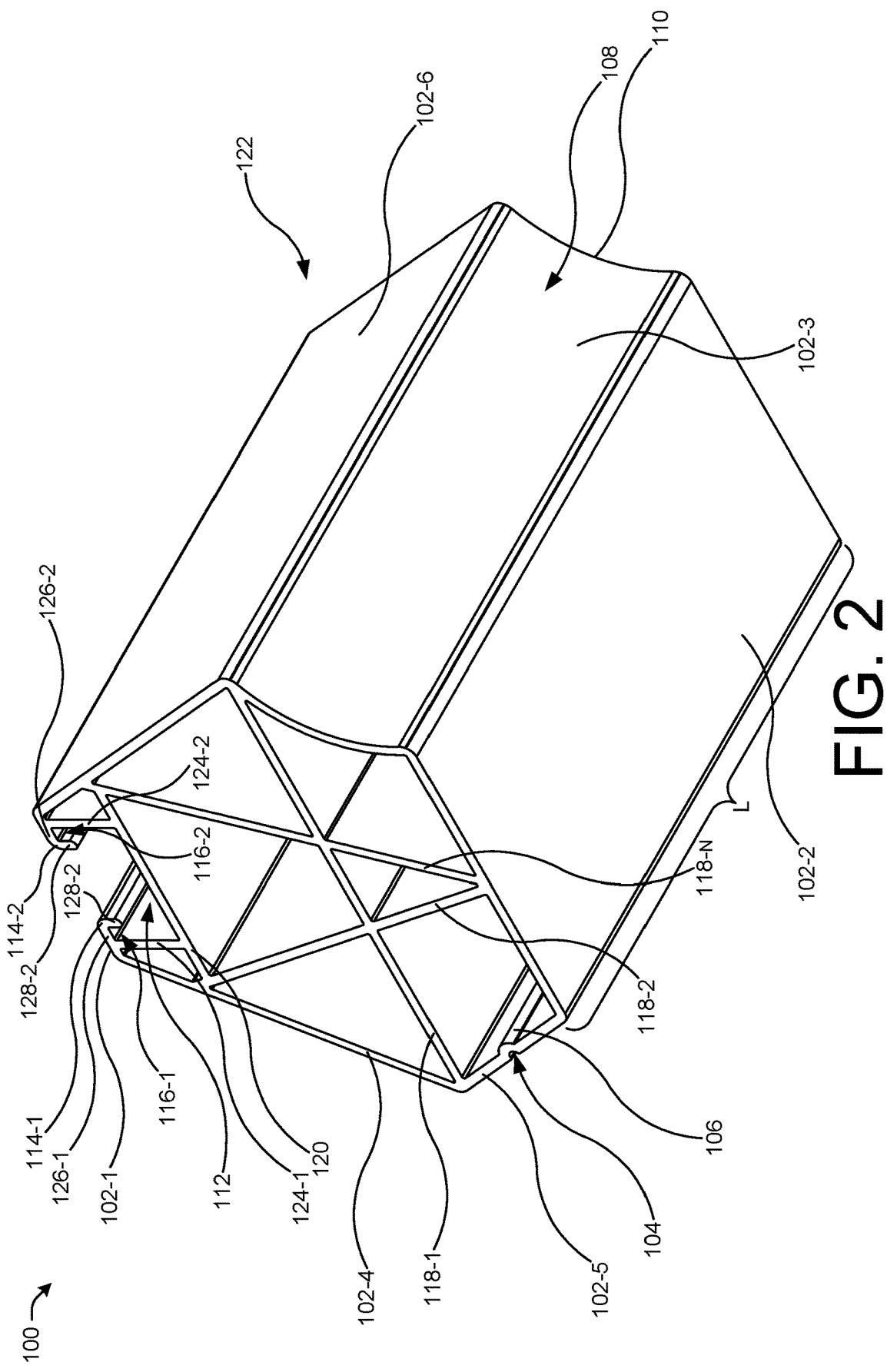
FIG. 2 illustrates a bottom, rear perspective view of the pipe support of FIG. 1, according to an example of the principles described herein.
Figure 3:
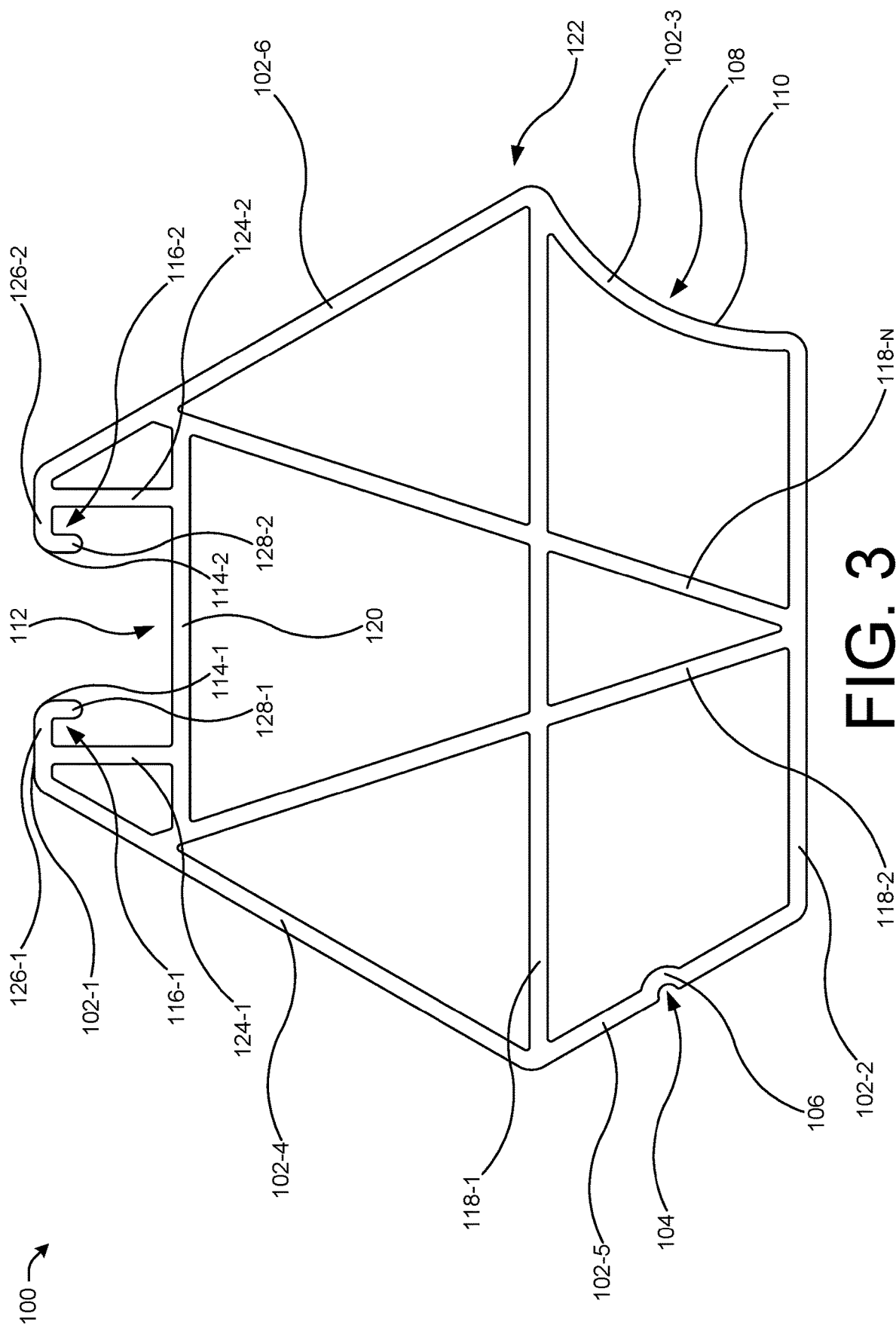
FIG. 3 illustrates a front side view of the pipe support of FIG. 1, according to an example of the principles described herein.
Figure 4:
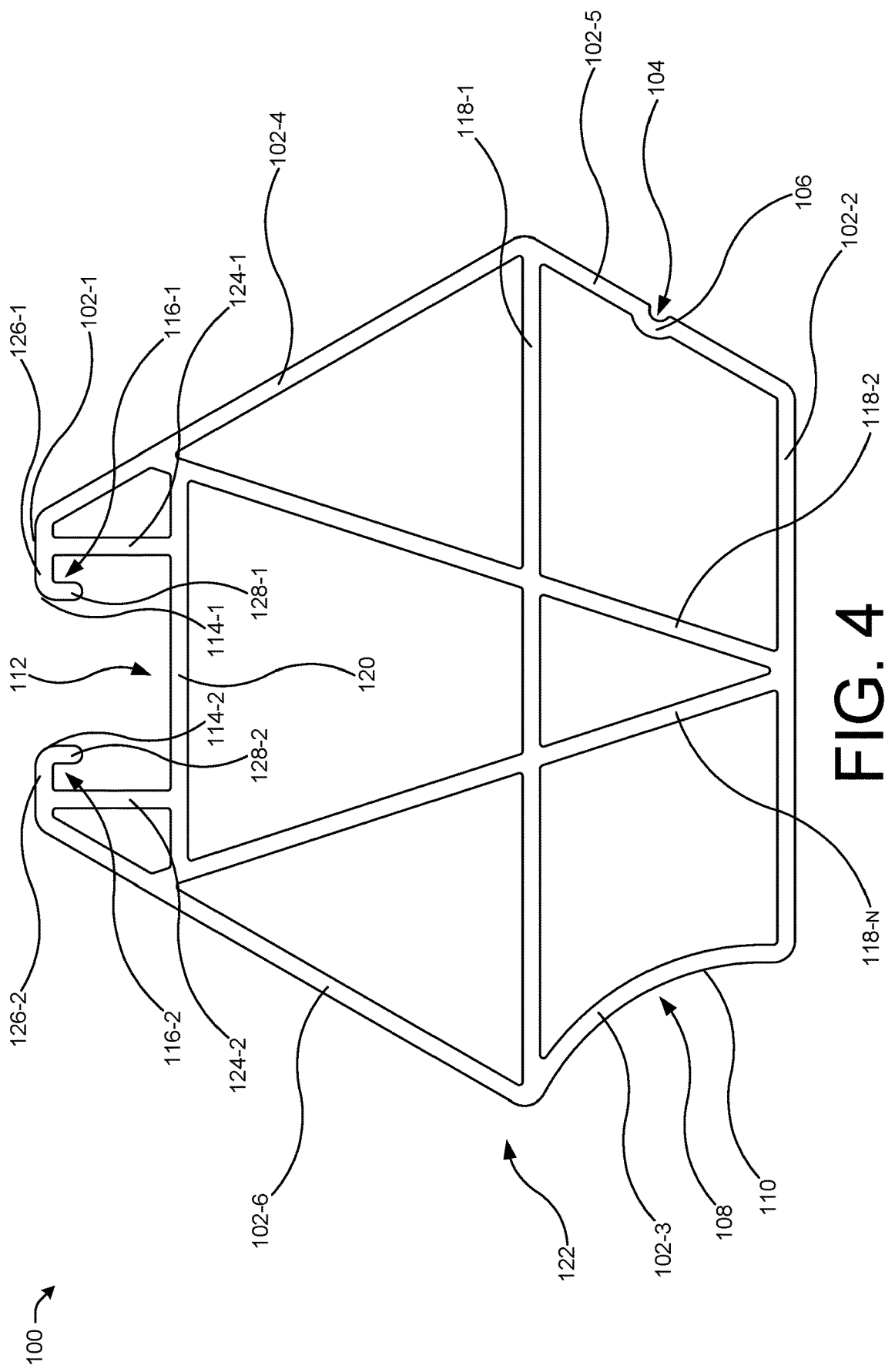
FIG. 4 illustrates a rear side view of the pipe support of FIG. 1, according to an example of the principles described herein.
Figure 5:
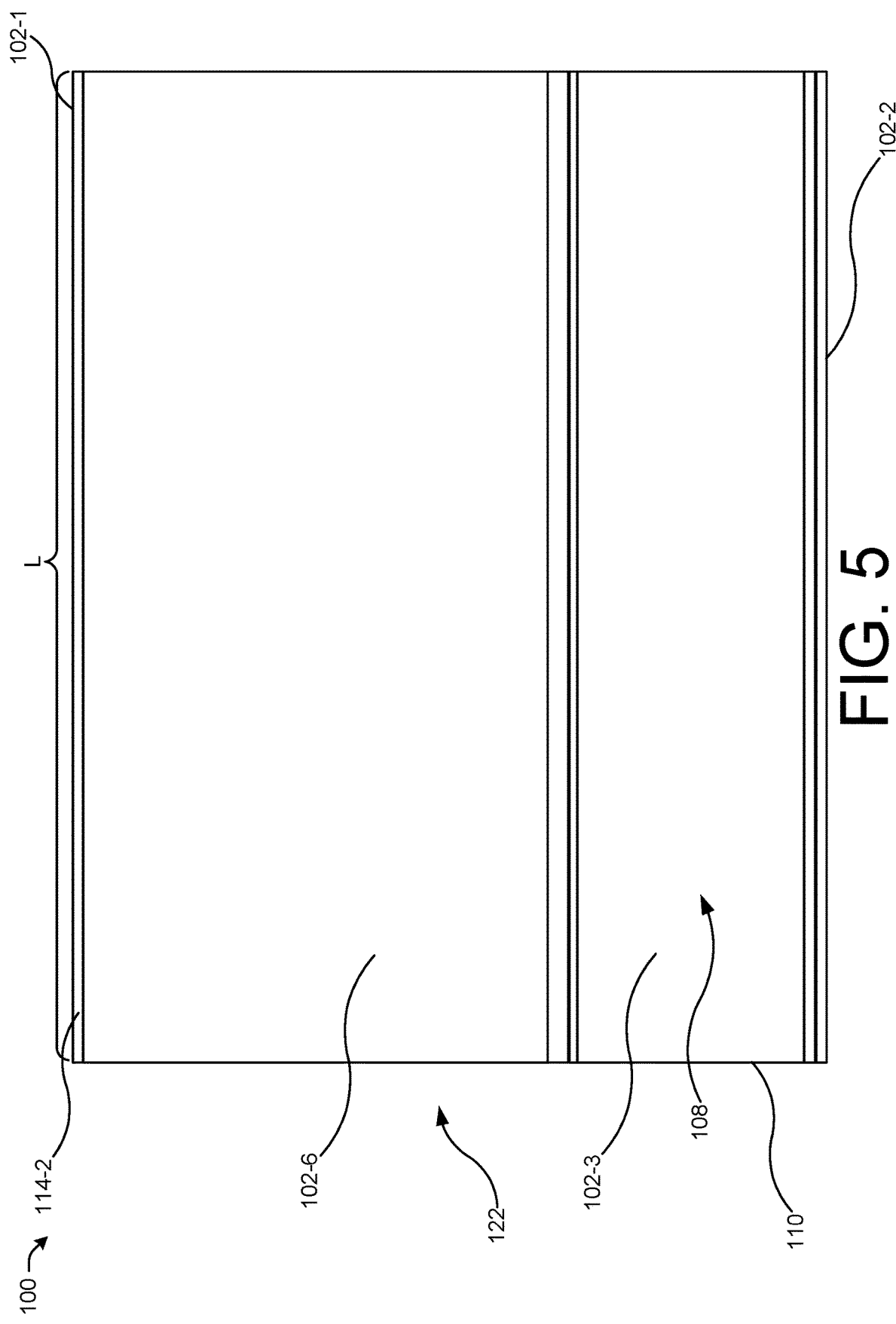
FIG. 5 illustrates a right side view of the pipe support of FIG. 1, according to an example of the principles described herein.
Figure 6:
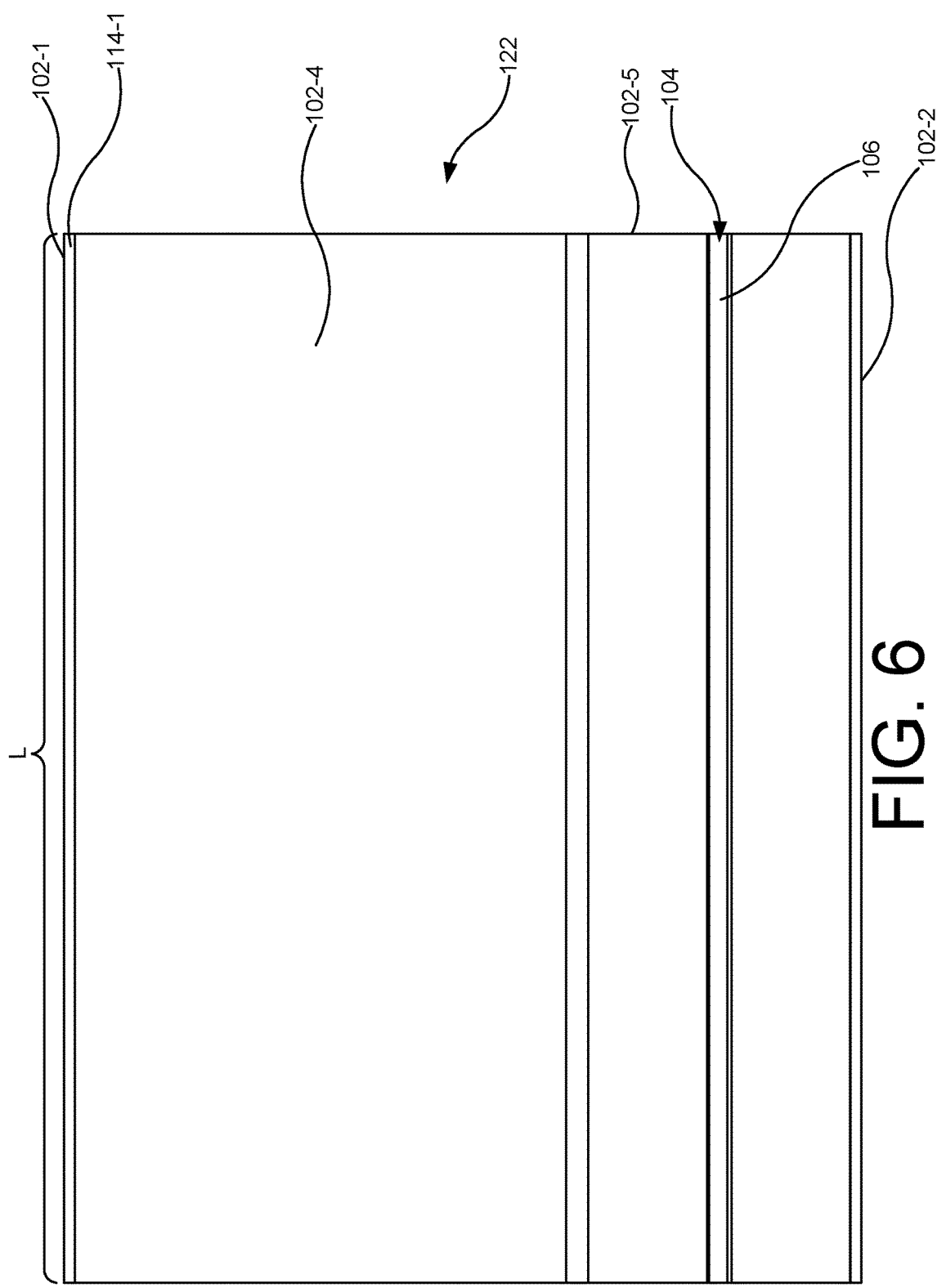
FIG. 6 illustrates a left side view of the pipe support of FIG. 1, according to an example of the principles described herein.
Figure 7:
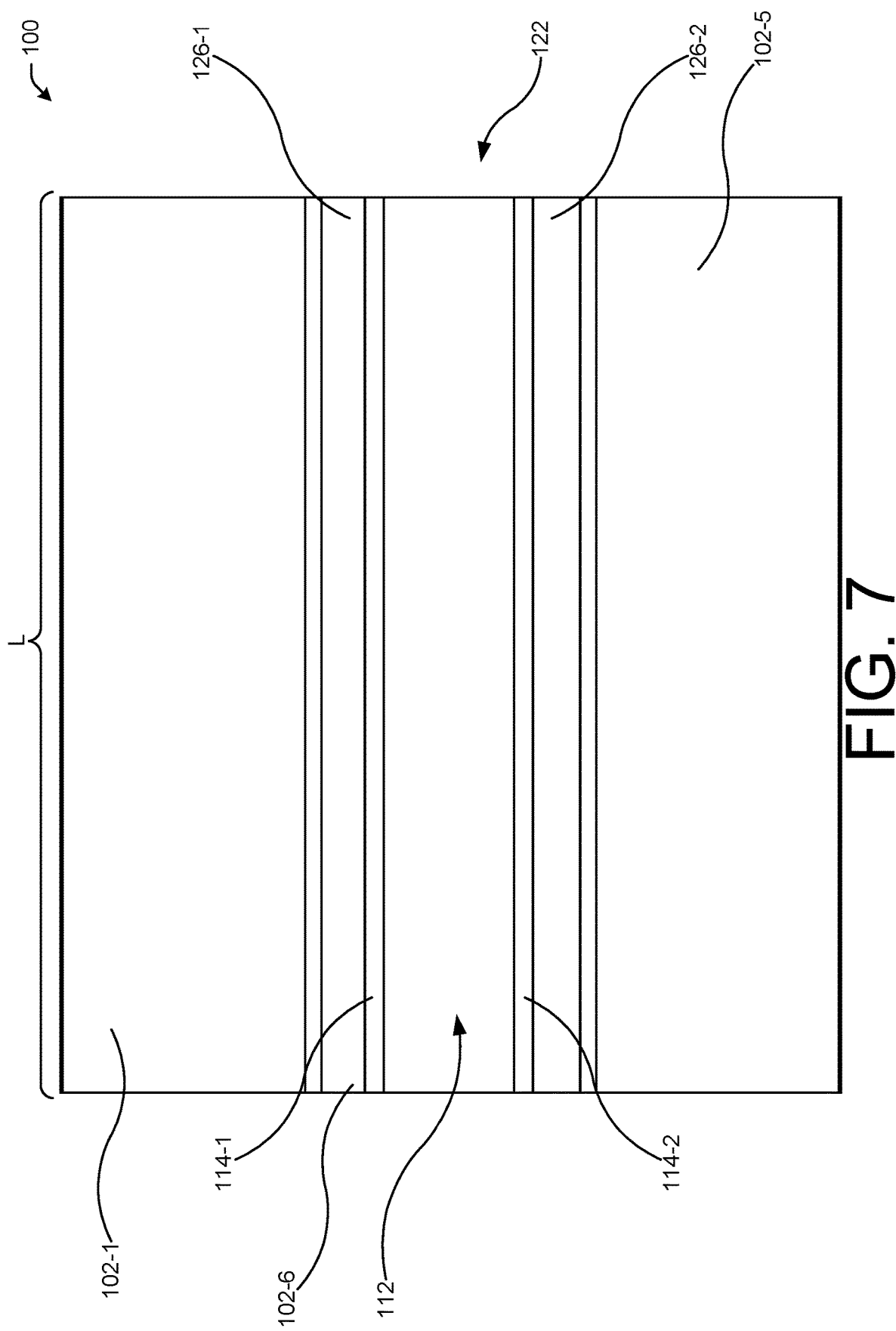
FIG. 7 illustrates a top view of the pipe support of FIG. 1, according to an example of the principles described herein.
Figure 8:
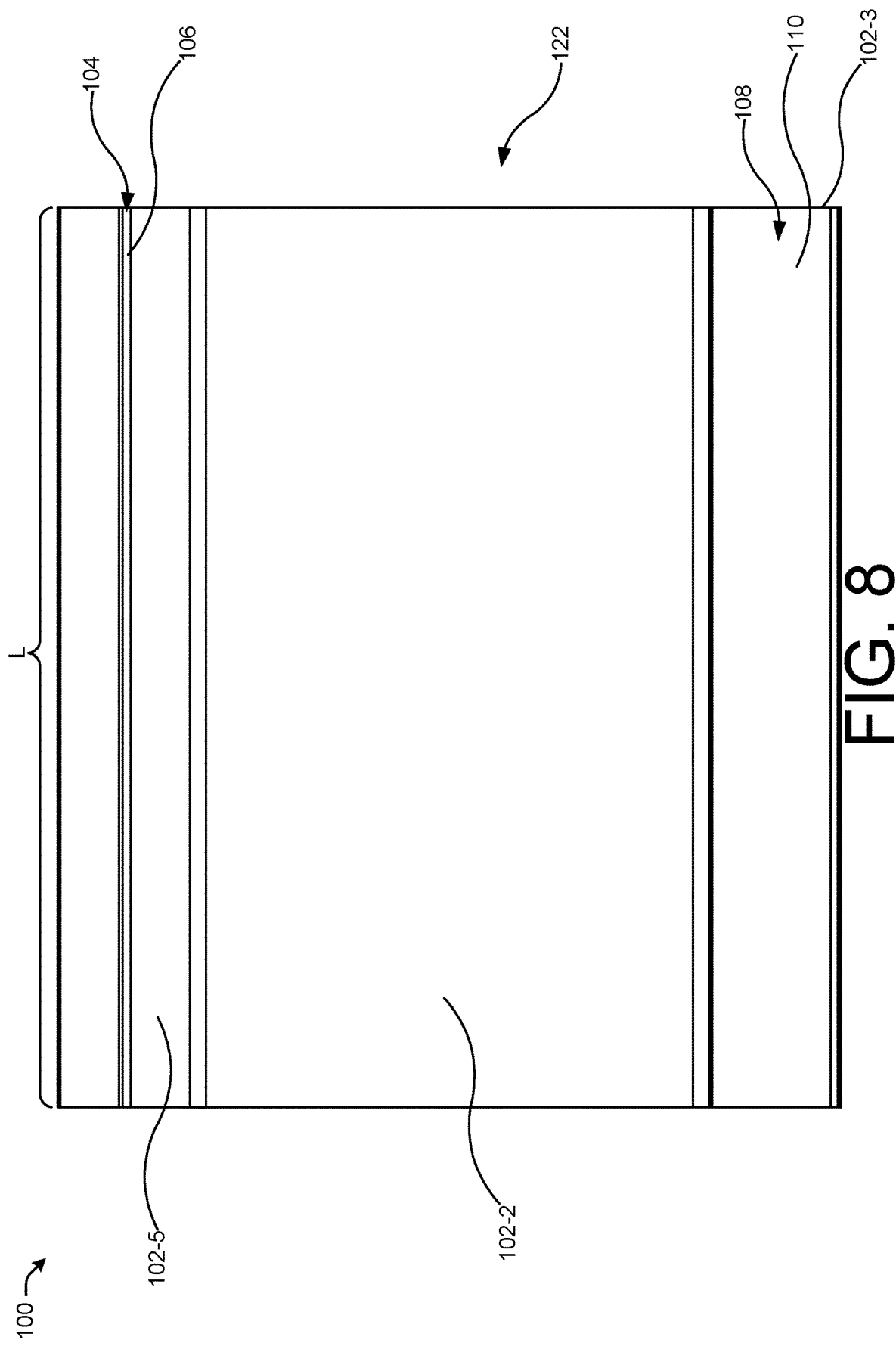
FIG. 8 illustrates a bottom view of the pipe support of FIG. 1, according to an example of the principles described herein.

Turning now to the figures, FIG. 1 illustrates a top, front perspective view of a pipe support 100, according to an example of the principles described herein. FIG. 2 illustrates a bottom, rear perspective view of the pipe support 100 of FIG. 1, according to an example of the principles described herein. FIG. 3 illustrates a front side view of the pipe support 100 of FIG. 1, according to an example of the principles described herein. FIG. 4 illustrates a rear side view of the pipe support 100 of FIG. 1, according to an example of the principles described herein. FIG. 5 illustrates a right side view of the pipe support 100 of FIG. 1, according to an example of the principles described herein. FIG. 6 illustrates a left side view of the pipe support 100 of FIG. 1, according to an example of the principles described herein. FIG. 7 illustrates a top view of the pipe support 100 of FIG. 1, according to an example of the principles described herein. FIG. 8 illustrates a bottom view of the pipe support 100 of FIG. 1, according to an example of the principles described herein. The pipe support 100 will now be described in connection with FIGS. 1 through 8 together.

The pipe support 100, as described herein, may be used to support any type of object including any object installed on the roof of a structure. Thus, despite being referred to herein as a "pipe support" herein, the pipe support 100 may be used to support any type of infrastructure element such as, piping (e.g., natural gas pipes, water pipes, drainage pipes, etc.), electrical conduits, telecommunication conduits, and other infrastructure as well as appliances that may be installed on the rooftop such as HVAC devices (e.g., air conditioning units, heating units, humidity control units, utility meters, etc.).

The pipe support 100 may include a multi-sided cross section such as, for example, a hexagonal cross section. In one example, the multi-sided cross section may have sides that are unequal in length, or may be a regular, equilateral, equiangular, or other polygonal cross-sectional shape such as, for example, a regular hexagon, an equilateral hexagon, an equiangular hexagon, or other cross-sectional shape with six sides. Further, even though the examples described herein describe a hexagonal cross-section, the cross-section of the pipe support 100 may have any number of sides including less than six sides and more than six sides. In one example, the number of sides of the pipe support 100 may be even numbered so that a first side of the pipe support 100 may rest on the roof surface with a second side of the pipe support 100 opposite the first side being parallel with the roof surface.

In one example, the pipe support 100 may include a first side 102-1, a second side 102-2, a third side 102-3, a fourth side 102-4, a fifth side 102-5, and a sixth side 102-6. The first side 102-1 may be opposite the second side 102-2, the third side 102-3 may be opposite the fourth side 102-4, and the fifth side 102-5 may be opposite the sixth side 102-6.

The first side 102-1 may face upward and parallel with the roof surface when the second side 102-2 of the pipe support 100 is in contact with the roof surface. The first side 102-1 may include a channel 112 defined along the length L of the body 122 of the pipe support 100. The channel 112 may be defined by a base portion 120, a first side wall 124-1, and a second side wall 124-2. In one example, the first side wall 124-1 may be formed perpendicular to the base portion 120 at a first side of the base portion 120. Further, the first side wall 124-1 may be defined along the length L of the body 122 and alongside the base portion 120. Similarly, the second side wall 124-2 may be formed perpendicular to the base portion 120 at a second side of the base portion 120. Further, the second side wall 124-2 may be defined along the length L of the body 122.

The channel 112 may further include a first overhang 114-1 coupled to the first side wall 124-1 and a second overhang 114-2 coupled to the second side wall 124-2. The first overhang 114-1 may include a first horizontal portion 126-1 coupled to or formed perpendicularly to the first side wall 124-1 and formed along the length L of the body 122 of the pipe support 100. The first horizontal portion 126-1 may also be coupled to and/or extend from the fourth side 102-4. A first protrusion 128-1 may be coupled perpendicularly to the first horizontal portion 126-1 and formed along the length L of the body 122 of the pipe support 100. In a similar manner, the second overhang 114-2 may include a second horizontal portion 126-2 coupled to or formed perpendicularly to the second side wall 124-2 and formed along the length L of the body 122 of the pipe support 100. The second horizontal portion 126-2 may also be coupled to and/or extend from the sixth side 102-6. A second protrusion 128-2 may be coupled perpendicularly to the second horizontal portion 126-2 and formed along the length L of the body 122 of the pipe support 100.

Figure 9:
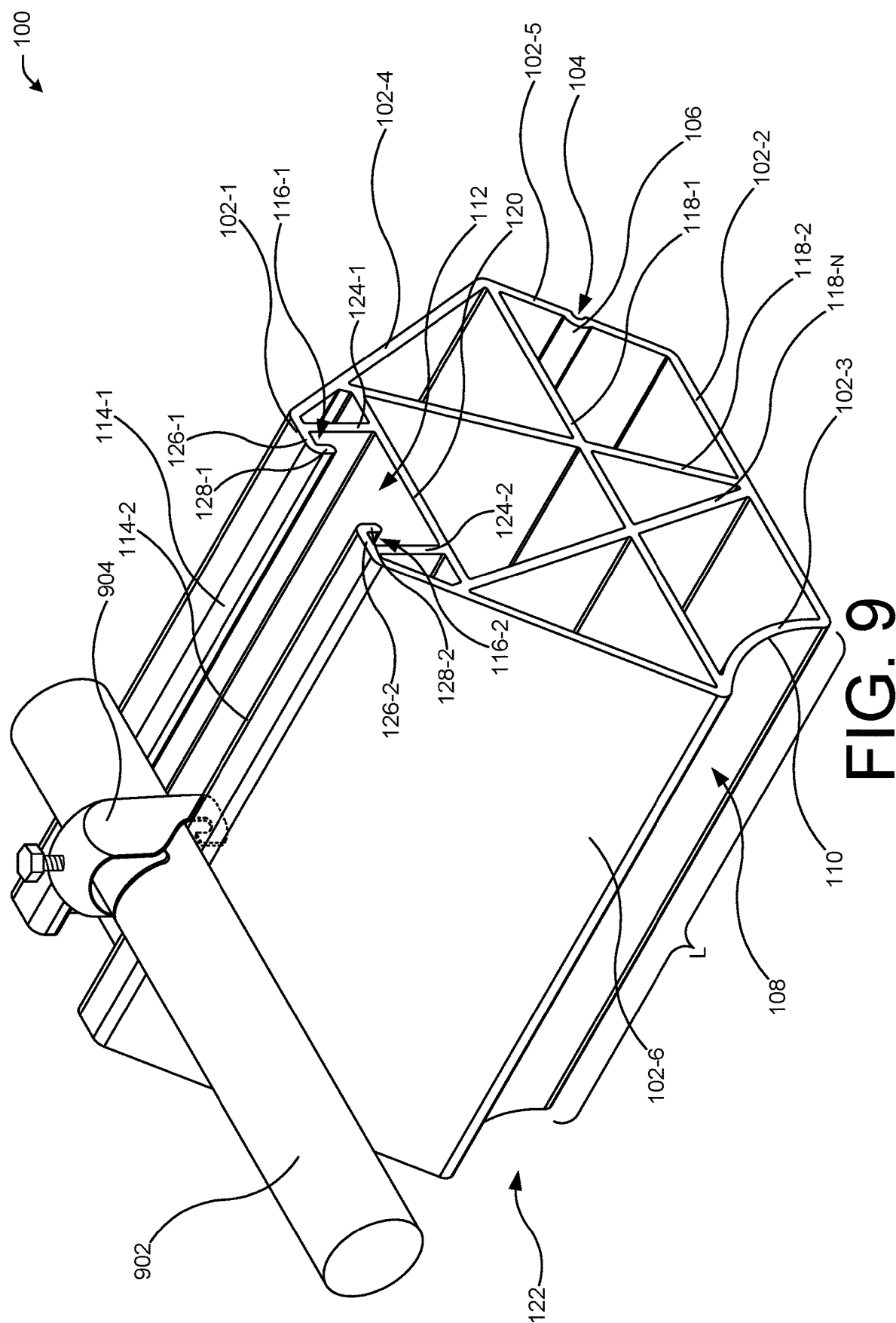
FIG. 9 illustrates a top, front perspective view of the pipe support of FIG. 1 including an infrastructure element coupled thereto, according to an example of the principles described herein.

The first overhang 114-1 including the first side wall 124-1, the first horizontal portion 126-1, and the first protrusion 128-1 may form a first retention channel 116-1, and the second overhang 114-2 including the second side wall 124-2, the second horizontal portion 126-2, and the second protrusion 128-2 may form a second retention channel 116-2. The first retention channel 116-1 and the second retention channel 116-2 may serve to allow for the attachment of a number of devices such as, for example, a strut nut, a bolt, a spring-biased strut nut, a strut clamp, a clamp that clamps objects such as electric metallic tube (EMT) conduit parallel with the longitudinal axis of the body 122 of the pipe support 100, a clamp that clamps objects such as the EMT conduit perpendicular to the longitudinal axis of the body 122 of the pipe support 100, beam clamps, cable cleats, other mechanical fastening devices, and combinations thereof that may engage with the channel 112, the base portion 120, first side wall 124-1, the second side wall 124-2, the first horizontal portion 126-1, first protrusion 128-1, the second horizontal portion 126-2, and/or the second protrusion 128-2, and combinations thereof. FIG. 9 illustrates a top, front perspective view of the pipe support 100 of FIG. 1 including an infrastructure element coupled thereto, according to an example of the principles described herein. In the example of FIG. 9, the infrastructure element is a clamp 904 that clamps objects such as the EMT conduit 902 perpendicular to the longitudinal axis of the body 122 of the pipe support 100. Any number of infrastructure elements may be coupled to the first side 102-1 of the pipe support 100. In this manner, the first side 102-1 of the pipe support 100 may be referred to as a strut side that allows for the attachment of clamps and fittings for the retention of conduit, wiring, piping, and other applications.

As depicted in the FIGS. 1 through 9, the first overhang 114-1 forming the first retention channel 116-1 and the second overhang 114-2 forming the second retention channel 116-2 may be formed as a monolithic portion of the first side 102-1 of the pipe support 100. Being monolithically formed with the pipe support 100 allows for the first overhang 114-1 forming the first retention channel 116-1 and the second overhang 114-2 forming the second retention channel 116-2 to be extruded as a single element along with the other elements of the pipe support 100 described herein. This simplifies manufacturing of the pipe support 100 and increases the strength of the pipe support 100 since additional parts that would otherwise make up the channel 112 are not required to be coupled to the pipe support 100.

The third side 102-3 of the pipe support 100 serves as a pipe seat into which pipes having various diameters may be seated. When the pipe support 100 is oriented with the fourth side 102-4 of the pipe support 100 in contact with the roof surface, the third side 102-3 of the pipe support 100 may face upward and parallel with the roof surface. In one example, the third side 102-3 may include a concave surface 110 defined along the length L of the body 122 of the pipe support 100 that creates a concave void 108 defined in the third side 102-3. The concave void 108 serves as a pipe saddle on which a pipe 1002 may be seated. In one example, the concave surface 110 may have a curvature that matches a curvature of an outer surface of the pipe 1002 that is seated on the concave surface 110. The pipes 1002 that may be seated on the concave surface 110 may have a diameter of up to, for example, 3 inches (in.). However, the concave surface 110 may include any curvature that may accommodate pipes 1002 of various diameters.

Figure 10:
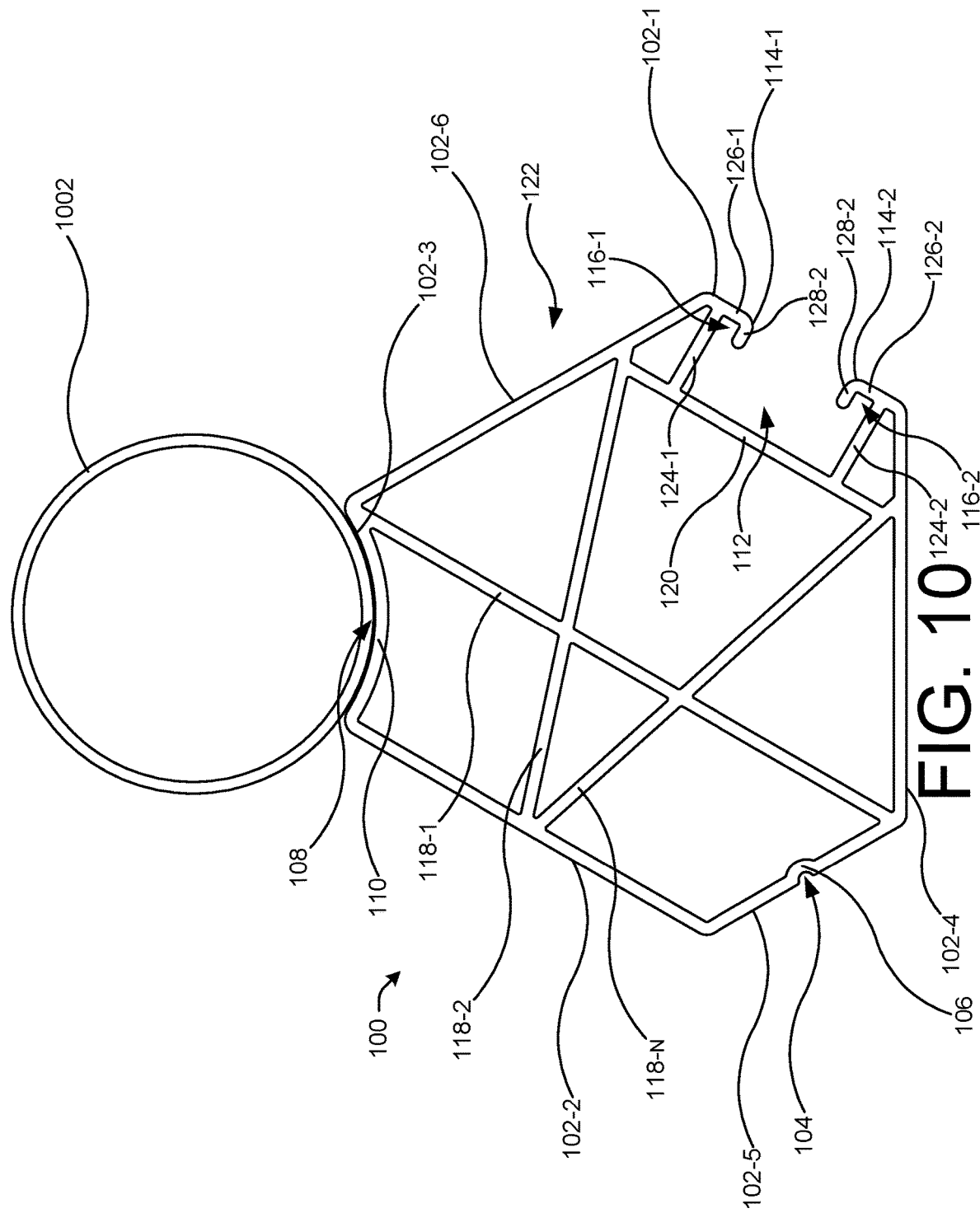
FIG. 10 illustrates a rear side view of the pipe support of FIG. 1 including an infrastructure element coupled thereto, according to an example of the principles described herein.

In one example, the pipes 1002 may be seated on the pipe support 100 in the manner described and depicted in connection with FIG. 10 and allowed to be secured by the concave surface 110 and within the concave void 108 defined in the third side 102-3. In this example, the curvature of the concave surface 110 and the concave void 108 defined in the third side 102-3 may, through the force of gravity, retain the pipe 1002 therein. In one example, a coupling device may be utilized to retain the pipe 1002 within the concave surface 110 and within the concave void 108. The coupling device that may be used to couple the pipe 1002 to the pipe support 100 may include a hanger straps, clamps or other coupling devices that may secure the pipe 1002 to the pipe support 100. In one example, screws or other fasteners may be used in conjunction with the coupling device where the screws or other fasteners are inserted into any portion of the pipe support such as another one of the first side 102-1, the second side 102-2, the fourth side 102-4, the fifth side 102-5, and the sixth side 102-6.

The fifth side 102-5 of the pipe support 100 may serve as a device coupling surface. FIG. 11 illustrates a rear side view of the pipe support 100 of FIG. 1 including a device 1102 coupled thereto, according to an example of the principles described herein. The device 1102 may include portions of an appliance such as an HVAC device, railings or other supports that support the appliance, stairways, walkways, and other types of devices. As mentioned above, the pipe support 100 may be used to raise appliances off a surface such as a rooftop in order to ensure that the appliances are not set directly on the surface which may otherwise result in damage to the surface and/or the appliance. Thus, the fifth side 102-5 of the pipe support 100 may be used to provide support to the appliances or other devices that may be place on the surface.

The fifth side 102-5 may face upward and parallel with the roof surface when the sixth side 102-6 of the pipe support 100 is in contact with the roof surface. The fifth side 102-5 may include a recess 104 defined along the length L of the body 122 of the pipe support 100. The recess 104 may create a corresponding protrusion 106 into the interior of the pipe support 100. In one example, the recess 104 may assist a user such as an installer of the device 1102 to align fasteners projected through the device 1102 with the pipe support 100. Line 1104 indicates the visual alignment an installer of the device 1102 may utilize when coupling the device 1102 to the pipe support 100. In one example of how the device 1102 may be coupled to the pipe support 100, an installer may extend a fastener such as a screw, a lag bolt, a bolt, a rivet, or similar fastener through the device 1102 such as a structural support portion of an HVAC device and into the pipe support 100. The support portion of the HVAC device may include, for example, a predrilled hole through which such a fastener may be extended in order to couple the HVAC device to another element as part of installation of the HVAC device. The installer may be guided by the recess 104 in order to properly orient the HVAC device with respect to the pipe support 100. The installer may then cause the fastener to be drilled into or otherwise passed through the pipe support 100 at the recess 104 located on the fifth side 102-5 of the pipe support 100. Because the pipe support 100 includes empty interior portions, the fastener may extend into those empty interior portions and the fastener may be further secured via, for example, a bolt, through the deformation of the end of the fastener that extends through the fifth side 102-5 of the pipe support 100, or through other secondary fastening means.

Throughout FIGS. 1 through 11, the pipe support 100 may include a number of empty interior portions to decrease weight to assist in installation, reduce costs in manufacturing by reducing material within the pipe support 100 and thus reducing costs, and for other reasons. However, in order to ensure structural integrity and allow the pipe support 100 to support even very heavy loads, the pipe support may include at least one internal support 118-1, 118-2, 118-N (where N is any integer greater than or equal to 1 (collectively referred to herein as internal support(s) 118 unless specifically addressed otherwise). Although three internal support(s) 118 are depicted in FIGS. 1 through 11, any number of internal support(s) 118 may be included within the pipe support 100. In one example, the internal support(s) 118 may be monolithically formed with the first side 102-1, second side 102-2, third side 102-3, fourth side 102-4, fifth side 102-5, and/or sixth side 102-6. In this example, the internal support(s) 118 may be extrude as a single element along with the other elements of the pipe support 100 described herein. However, the internal support(s) 118 may be coupled to the other elements of the pipe support 100 described herein using any method and/or means.

The internal supports 118 may extend from the first side 102-1, second side 102-2, third side 102-3, fourth side 102-4, fifth side 102-5, or sixth side 102-6 to another one of these sides. For example, a first internal support 118-1 may extend between an intersection where the fourth side 102-4 and the fifth side 102-5 meet and an intersection where the third side 102-3 and the sixth side 102-6 meet. Further, a second internal support 118-2 may extend between the second side 102-2 and an intersection where the first side 102-1 and the fourth side 102-4 meet. Still further, a third internal support 118-N may extend between the second side 102-2 and an intersection where the first side 102-1 and the sixth side 102-6 meet. In this manner, the internal supports 118 may ensure that the pipe support 100 is reinforced enough to support and withstand even very heavy loads.

In the examples described herein, the pipe support 100 may be formed via a number of manufacturing processes. In one example, and as mentioned herein, the pipe support 100 may be formed through an extrusion process where the cross-section of the pipe support is formed through the pushing of material through at least one die defining the cross-section of the pipe support 100. In this example, the pipe support 100 may be made of any material that may be extruded via any form of hot or cold extrusion process including, for example, metals, metal alloys, plastics, magnesium, steel, titanium, nickel, refractory alloys, copper, lead, tin, aluminum, aluminum alloys, molybdenum, vanadium, zirconium, niobium, acrylics, acrylonitrile butadiene styrene (ABS), polycarbonates (PC), polyesters (PETG), polyethylene (PE) including high density polyethylene (HDPE) or low density polyethylene (LDPE), polypropylene (PP), polystyrene including general purpose polystyrene (GPPS) or high impact polystyrene (HIPS), polyvinyl chloride (PVC) including rigid polyvinyl chloride (RPVC) or flexible polyvinyl chloride (FPVC), other extrudable materials, and combinations thereof. Further, the pipe support 100 may be made of carbon fiber or carbon fiber reinforced polymers and formed using any carbon fiber manufacturing process.

Conclusion

The examples described herein provide a pipe support that may be used as a support for a number of objects in a number of different orientations due to the ability to rotate the multi-sided cross-sectional shape about the longitudinal axis of the pipe support to obtain different coupling functions of the pipe support. With the lightweight and multifunctional aspects of the pipe support, a user such as an installer may be able to install the pipe support easily and support a myriad of different objects.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A support device, comprising:
    a body comprising:
        a first side comprising an elongated channel;
        a second side opposite the first side, the second side comprising a first planar surface;
        a third side comprising a concave surface; and
        a fourth side opposite the third side, the fourth side comprising a second planar surface;
        wherein each of the first planar surface and the second planar surface is configured to be positioned on a surface underlying the body and the first side, second side, third side and fourth side are positioned relative to one another in an arrangement where the first side faces away from the surface underlying the body when the first planar surface is positioned on the surface underlying the body and the third side faces away from the surface underlying the body when the second planar surface is positioned on the surface underlying the body.

2. The support device of claim 1, wherein the body further comprises:
    a fifth side, the fifth side comprising a recess; and
    a sixth side opposite the fifth side, the sixth side comprising a third planar surface.

3. The support device of claim 1, wherein the elongated channel comprises:
    a base portion formed parallel to the first side and defined along a length of the body;
    a first side wall formed perpendicular to the base portion at a first side of the base portion and defined along the length of the body;
    a second side wall formed perpendicular to the base portion at a second side of the base portion and defined along the length of the body;
    a first overhang coupled to the first side wall; and
    a second overhang coupled to the second side wall.

4. The support device of claim 3, wherein:
    the first overhang comprises:
        a first horizontal portion coupled perpendicularly to the first side wall and formed along the length of the body; and
        a first protrusion coupled perpendicularly to the first horizontal portion and formed along the length of the body; and
    the second overhang comprises:
        a second horizontal portion coupled perpendicularly to the second side wall and formed along the length of the body; and
        a second protrusion coupled perpendicularly to the second horizontal portion and formed along the length of the body.

5. The support device of claim 1, wherein the concave surface defined in the third side of the body comprises a curvature that matches a curvature of an outer surface of a pipe.

6. The support device of claim 2, wherein the recess defined in the fifth side of the body is dimensioned to position a fastener into the recess.

7. The support device of claim 2, further comprising at least one internal support.

8. The support device of claim 7, wherein the at least one internal support comprises:
    a first internal support formed between the first side and a middle of the second side;
    a second internal support formed between the first side and the middle of the second side; and
    a third internal support formed between a first intersection of the fifth side and the fourth side and a second intersection of the third side and the sixth side.

9. The support device of claim 7, wherein the at least one internal support is monolithically formed with at least two of the first side, the second side, the third side, the fourth side, the fifth side, and the sixth side.

10. The support device of claim 1, wherein the support device comprises a metal, a metal alloy, a polymer, carbon fiber, or combinations thereof.

11. A support device comprising:
    a body comprising:
        a first side comprising an elongated channel;
        a second side opposite the first side, the second side comprising a first planar surface;
        a third side comprising a concave surface;
        a fourth side opposite the third side, the fourth side comprising a second planar surface;
        a fifth side comprising a recess; and
        a sixth side opposite the fifth side, the sixth side comprising a third planar surface;
        wherein each of the first planar surface, the second planar surface and the third planar surface is configured to be positioned on a surface underlying the body and the first side, second side, third side, fourth side, fifth side and sixth side are positioned relative to one another in an arrangement where a respective one of the first side, third side and fifth side faces away from the surface underlying the body when a respective one of the first planar surface, second planar surface and third planar surface is positioned on the surface underlying the body.

12. The support device of claim 11, wherein the elongated channel comprises:
    a base portion formed parallel to the first side and defined along a length of the body;
    a first side wall formed perpendicular to the base portion at a first side of the base portion and defined along the length of the body;

a second side wall formed perpendicular to the base portion at a second side of the base portion and defined along the length of the body;
a first overhang coupled to the first side wall; and
a second overhang coupled to the second side wall.

13. The support device of claim 12, wherein:
the first overhang comprises:
   a first horizontal portion coupled perpendicularly to the first side wall and formed along the length of the body; and
   a first protrusion coupled perpendicularly to the first horizontal portion and formed along the length of the body; and
the second overhang comprises:
   a second horizontal portion coupled perpendicularly to the second side wall and formed along the length of the body; and
   a second protrusion coupled perpendicularly to the second horizontal portion and formed along the length of the body.

14. The support device of claim 11, wherein the concave surface defined in the third side of the body comprises a curvature that matches a curvature of an outer surface of a pipe.

15. The support device of claim 11, wherein the recess defined in the fifth side of the body is dimensioned to position a fastener into the recess.

16. The support device of claim 11, further comprising at least one internal support.

17. The support device of claim 16, wherein the at least one internal support comprises:
   a first internal support formed between the first side and a middle of the second side;
   a second internal support formed between the first side and the middle of the second side; and
   a third internal support formed between a first intersection of the fifth side and the fourth side and a second intersection of the third side and the sixth side.

18. The support device of claim 16, wherein the at least one internal support is monolithically formed with at least two of the first side, the second side, the third side, the fourth side, the fifth side, and the sixth side.

19. The support device of claim 11, wherein the support device comprises a metal, a metal alloy, a polymer, carbon fiber, or combinations thereof.

20. The support device of claim 11, wherein the channel is configured to couple with a strut nut.

* * * * *